Patented Sept. 17, 1940

2,215,087

UNITED STATES PATENT OFFICE 2,215,087

AZO DYESTUFFS

Hugo Schweitzer, Leverkusen-Wiesdorf, Germany, assignor to General Aniline & Film Corporation, a corporation of Delaware No Drawing. Application July 21, 1938, Serial No. 220,501. In Germany July 24, 1937

6 Claims. (Cl. 260—166)

The present invention relates to new polyazo dyestuffs and to a process of preparing the same; more particularly it relates to polyazo dyestuffs of the general formula

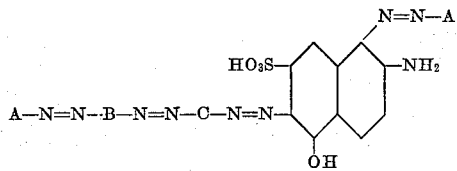

In this formula A stands for an aromatic radical containing the o-hydroxycarboxylic acid grouping and B and C stand for the residues of aminobenzene or aminonaphthalene being coupled in p-position to the amino group; the radicals B and C may contain sulfonic acid groups, and may be substituted by further radicals as for instance by alkyl radicals, alkoxy radicals and so on.

My new dyestuffs are obtainable by coupling diazo compounds of diazo dyestuffs of the general formula

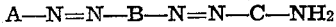

wherein A, B and C mean the same as stated above, with monoazo dyestuffs as they are obtained by coupling an aromatic diazo compound containing the o-hydroxycarboxylic acid grouping with 2-amino-5-hydroxynaphthalene-7-sulfonic acid to the side of the amino group i. e., in 1-position.

The new dyestuffs which contain at each end of the dyestuff molecule the o-hydroxycarboxylic acid grouping dye vegetable fibers in currant to blue shades, which change into currant to grey shades with good fastness to light and washing when after-treated on the fiber with copper salts; the good fastness to washing is especially to be emphasized.

The following examples illustrate the invention without limiting it thereto, the parts being by weight:

Example 1

15.3 parts of p-aminosalicylic acid are diazotised in the usual manner and coupled with 22.3 parts of 1-amino-naphthalene-7-sulfonic acid in the presence of sodium acetate. The separated monoazo dyestuff is then dissolved with 12 parts of anhydrous sodium carbonate, to the solution 70 ccm. of a 10 per cent sodium nitrite solution are added, and the mixture is run at a temperature of 15° C. into a mixture of 75 parts of crude hydrochloric acid and 100 parts of water. When the diazotisation is complete the separated diazo compound is filtered off, washed and, in the presence of 20 parts of sodium acetate, combined with 14.3 parts of 1-aminonaphthalene to the diazo dyestuff. After finishing the coupling, the separated dyestuff is filtered off, washed, dissolved with water and some caustic soda lye, and further diazotised by adding 70 ccm. of a 10 per cent sodium nitrite solution and running this solution into a mixture of 75 parts of crude hydrochloric acid and 100 parts of water at a temperature of 0–5° C. The diazo compound filtered off and washed, is combined in a medium alkaline with sodium carbonate with 40.3 parts of the monoazo dyestuff, obtained by coupling in an acid medium diazotised p-aminosalicylic acid with 2-amino-5-hydroxynaphthalene-7-sulfonic acid.

When the coupling is complete the dyestuff having the formula

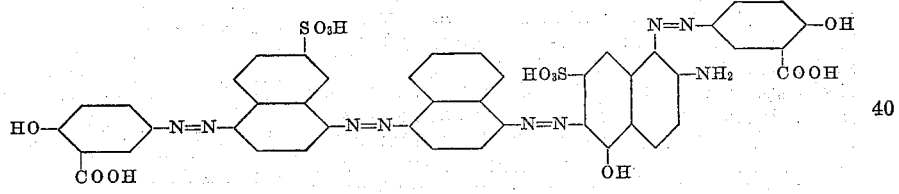

is worked up. It dyes cotton blue shades, which change into grey shades, fast to light and washing, when after-treated on the fiber with copper salts.

If instead of p-aminosalicylic acid p-aminocresotinic acid or instead of 1-aminonaphthalene-7-sulfonic acid 1-amino-naphthalene-6-sulfonic acid is used, or if in building up the dyestuff the sequence of the 1-aminonaphthalene-6- or -7-sulfonic acid and the 1-aminonaphthalene is reversed, dyestuffs of similar properties are obtained.

Example 2

27.5 parts of the monoazo dyestuff p-aminosalicylic acid-azo-aniline are diazotised. The separated diazo compound is added to a solution of 20.2 parts of a 3-toluidine-methane-sulfonic acid, containing sodium acetate. When the coupling is complete the dyestuff is filtered off. The dyestuff is saponified by boiling it for half an hour with a 25 per cent aqueous sodium hydroxide solution and, when the solution has become cold, the disazo dyestuff is separated by adding hydrochloric acid, washed and dried. Thereupon the dyestuff is further diazotised in nitrosylsulfuric acid at a temperature of −5° C., the solution poured on ice, the separated diazo compound filtered off, washed and combined in a medium alkaline with sodium carbonate with 40.3 parts of the monoazo dyestuff, obtained by coupling in an acid medium diazotised p-aminosalicylic acid with 2-amino-5-hydroxynaphthalene-7-sulfonic acid.

After finishing the coupling the dyestuff having the formula

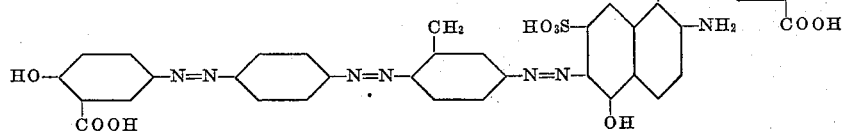

is worked up. It dyes cotton currant shades, which change into black-currant shades, fast to light and washing, when after-treated, on the fiber with copper salts. If instead of the toluidine-methanesulfonic acid the aniline-methanesulfonic acid or the 2-toluidine-methanesulfonic acid, or instead of the p-aminosalicylic acid the p-aminocresotinic acid is used, dyestuffs of similar properties are obtained.

Example 3

30 parts of the monoazodyestuff obtained from diazotised p-aminosalicylic acid and 3-amino-4-cresol-1-methylether are diazotised in the usual manner. This diazo compound is added to a solution of 24.5 parts of 1-aminonaphthalene-7-sulfonic acid, containing sodium acetate. When the coupling is complete the disazodyestuff is isolated, then dissolved with water and some caustic soda lye, and further diazotised by adding 70 ccm. of a 10 per cent sodium nitrite solution and running this solution into a mixture of 75 parts of crude hydrochloric acid and 100 parts of water at a temperature of 5–10° C. When the diazotisation is complete, the diazo compound is filtered off, washed and combined in a medium alkaline with sodium carbonate with 40.3 parts of the monoazodyestuff obtained by coupling in an acid medium diazotised p-aminosalicyclic acid with 2-amino-5-naphthalene-7-sulfonic acid.

When the coupling is complete the dyestuff having the formula

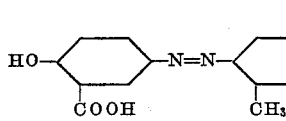

is worked up. It dyes cotton blue shades which change into grey shades fast to light and washing, when after-treated on the fiber with copper salts.

I claim:

1. As new products the azo dyestuffs of the general formula

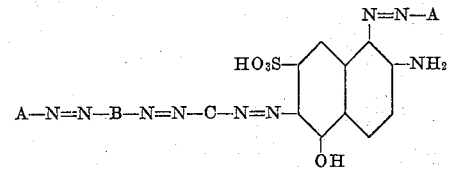

wherein A stands for the radical of an o-hydroxycarboxylic acid of the benzene series, and B and C stand for radicals of the group consisting of benzene and naphthalene and the alkyl, alkoxy and —SO₃H substitution products thereof, and wherein each of the radicals B and C bears the —N=N— groups attached in p-position to each other, yielding on vegetable fibers currant to blue shades which change, when after-treated with copper salts, into currant to grey shades of good fastness to light and washing.

2. As new products the azo dyestuffs of the general formula

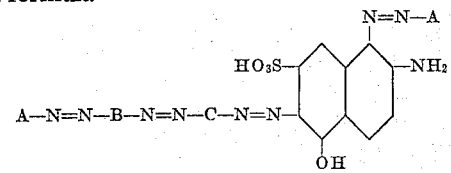

wherein A stands for the radical of an o-hydroxycarboxylic acid of the benzene series, and B and C stand for radicals of the group consisting of naphthalene and sulfonic acids thereof, and wherein each of the radicals B and C bears the —N=N— groups attached in p-position to each other, yielding on vegetable fibers currant to blue shades which change, when after-treated with copper salts, into currant to grey shades of good fastness to light and washing.

3. As new products the azo dyestuffs of the general formula

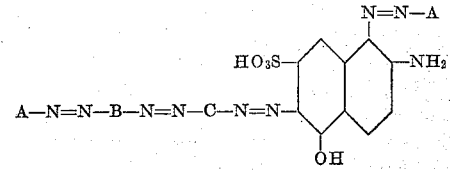

wherein A stands for the radical of an o-hydroxy-carboxylic acid of the benzene series, and B and C stand for radicals of the group consisting of benzene and alkyl, alkoxy and —SO₃H substitution products thereof, and wherein each of the radicals B and C bears the —N=N— groups attached in p-position to each other, yielding on vegetable fibers currant to blue shades which change, when after-treated with copper salts, into currant to grey shades of good fastness to light and washing.

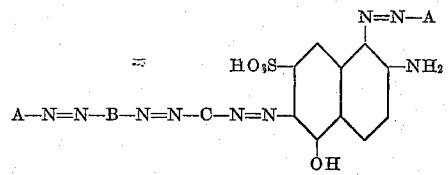

vegetable fibers currant to blue shades which change, when after-treated with copper salts, into currant to grey shades of good fastness to light and washing.

4. As new products the azo dyestuffs of the general formula

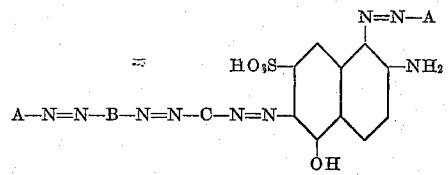

wherein A stands for the radical of an o-hydroxy-carboxylic acid of the benzene series, one of the middle components B and C stands for a radical of the group consisting of benzene and the alkyl, alkoxy and —SO₃H substitution products thereof and the other middle component stands for a radical of the group consisting of naphthalene and sulfonic acids thereof, and wherein each of the radicals B and C bears the —N=N— groups attached in p-position to each other, yielding on vegetable fibers currant to blue shades which change, when after-treated with copper salts, into currant to grey shades of good fastness to light and washing.

5. As new product the azo dyestuff corresponding in the free state to the following formula

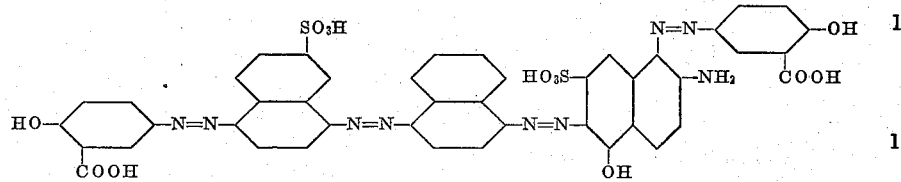

dyeing cotton blue shades which change, when after-treated on the fiber with copper salts, into grey shades fast to light and washing.

6. As new product the azo dyestuff corresponding in the free state to the following formula

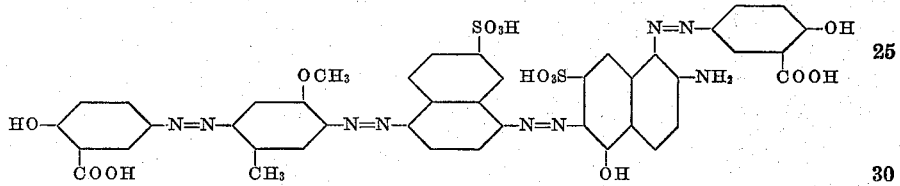

dyeing cotton blue shades which change, when after-treated on the fiber with copper salts, into grey shades fast to light and washing.

HUGO SCHWEITZER.